(12) United States Patent
Ziegler et al.

(10) Patent No.: US 10,608,741 B2
(45) Date of Patent: Mar. 31, 2020

(54) THROUGH THE AIR LINK OPTICAL COMPONENT

(71) Applicant: 4S-Silversword Software And Services, LLC, Catonsville, MD (US)

(72) Inventors: William Robert Allen Ziegler, Ijamsville, MD (US); Ronald H. Smith, Rockville, MD (US)

(73) Assignee: 4S-SILVERSWORD SOFTWARE AND SERVICES, LLC, Catonsville, MD (US)

( * ) Notice: Subject to any disclaimer, the term of this patent is extended or adjusted under 35 U.S.C. 154(b) by 0 days.

(21) Appl. No.: 15/991,973

(22) Filed: May 29, 2018

(65) Prior Publication Data

US 2019/0372669 A1 Dec. 5, 2019

(51) Int. Cl.
*H04B 10/112* (2013.01)
*H04B 10/25* (2013.01)
*H04B 10/50* (2013.01)
*H04B 10/516* (2013.01)

(52) U.S. Cl.
CPC ..... *H04B 10/2503* (2013.01); *H04B 10/1125* (2013.01); *H04B 10/1127* (2013.01); *H04B 10/502* (2013.01); *H04B 10/503* (2013.01); *H04B 10/516* (2013.01)

(58) Field of Classification Search
CPC ........................................... H04B 10/11–1129
See application file for complete search history.

(56) References Cited

U.S. PATENT DOCUMENTS

| 3,566,126 A * | 2/1971 | Lang | H04B 10/1125 359/245 |
|---|---|---|---|
| 4,732,879 A * | 3/1988 | Kalinowski | B01D 53/8628 423/215.5 |
| 6,381,055 B1 | 4/2002 | Javitt et al. | |
| 7,612,329 B2 | 11/2009 | Chalfant, III et al. | |
| 8,160,452 B1 | 4/2012 | Tidwell et al. | |
| 8,224,189 B1 | 7/2012 | Frolov | |

(Continued)

OTHER PUBLICATIONS

K.S. Shaik, "Atmospheric Propagation Effects Relevant to Optical Communications," NASA Communications Systems Research Section, TDA Progress Report 42-94, pp. 180-200, NASA, available on line at https://ntrs.nasa.gov/archive/nasa/casi.ntrs.nasa.gov/20040191353 (1988).

(Continued)

*Primary Examiner* — Nathan M Cors
(74) *Attorney, Agent, or Firm* — Miles & Stockbridge, P.C.

(57) ABSTRACT

Through-the-Air Link Optical Component is a low Size, Weight, and Power optical communications device that 1) acquires and maintains a broad band communications link between two platforms in line of sight with one another, 2) measures azimuth and elevation angle relative to each platform reference from one TALOC to the communicating TALOC and vice-versa, 3) measures distance between communicating TALOC units, and 4) sees through atmospheric disturbances such as clouds and fog. These remarkable functions open the door to several important derivative capabilities, such as determining absolute positions of all platforms in a community and formation of platform community into a phase array antenna.

18 Claims, 9 Drawing Sheets

(56) References Cited

U.S. PATENT DOCUMENTS

| | | | |
|---|---|---|---|
| 9,366,938 B1 | 6/2016 | Anderson et al. | |
| 9,774,395 B1* | 9/2017 | Goorjian | H04B 10/1123 |
| 9,813,151 B2 | 11/2017 | Kingsbury et al. | |
| 9,825,701 B2 | 11/2017 | Juarez et al. | |
| 9,954,612 B1 | 4/2018 | La Fata | |
| 9,954,613 B1* | 4/2018 | Goorjian | G01J 1/0411 |
| 10,003,402 B2 | 6/2018 | Boroson et al. | |
| 2004/0151504 A1* | 8/2004 | Triebes | H04B 10/1125 398/131 |
| 2004/0179848 A1* | 9/2004 | Belenkii | H04B 10/112 398/131 |
| 2007/0297805 A1* | 12/2007 | Rabinovich | H04B 10/2587 398/151 |
| 2009/0202254 A1* | 8/2009 | Majumdar | H04B 10/1123 398/140 |
| 2011/0274434 A1* | 11/2011 | Cunningham | H04B 10/112 398/118 |
| 2016/0204866 A1* | 7/2016 | Boroson | H04B 10/1121 398/97 |
| 2017/0302377 A1* | 10/2017 | Boroson | H04B 7/19 |

OTHER PUBLICATIONS

T. Nguyen et al., "Laser Beacon Tracking for Free-space Optical Communication on Small-Satellite Platforms in Low-Earch Orbit," Massachusetts Institute of Technology, Master's Thesis, pp. 1-94 (2015).

Q. Hu et al. "Eye-safe diode laser Doppler lidar with a MEMS beam-scanner," vol. 24, No. 3, DOI:10.1364/OE.24.001934, Optics Express, pp. 1-9 (2016).

B. R. Strickland et al., "Effects of fog on the bit-error rate of a free-space laser communication system," Applied Optics, vol. 38, No. 3, pp. 424-431 (1999).

P. Deng et al, "MEMS-based beam-steerable FSO communication for reconfigurable wireless data center," Proc. SPIE, vol. 10128, Broadband Access Communication Technologies XI, SSL #19-15, pp. 1012805-1 to 012805-9 (Jan. 28, 2017).

K. Riesing et al., "Development of Pointing, Acquisition, and Tracking System for a Nanosatellite Laser Communications Module," Massachusetts Institute of Technology, Master's Thesis, pp. 1-127, (Sep. 2015).

F. Dios et al., "Scintillation and beam-wander analysis in an optical ground station-satellite uplink," Applied Optics, vol. 43, No. 19, (Jul. 2014).

Soo Sim Daniel Neo, "Free Space Optics Communication for Mobile Military Platforms," Thesis, Naval Postgraduate School, Monterey, CA, Dec. 2003, pp. i-91.

Scott R.Davis et al., "New Electro-Optic Laser Scanners for Small-Sat to Ground Laser Communication Links," Vescent Photonics Inc., FSO proceedings, Feb. 11, 2016, 12 pages.

Issac I. Kim et al., "Scintillation reduction using multiple transmitters," Free-Space Laser Communications Technologies IX, Proc. SPIE vol. 2990, 1997, pp. 102-113.

* cited by examiner

THROUGH THE AIR LINK OPTICAL COMPONENT

CROSS-REFERENCE TO RELATED APPLICATIONS

This application claims the benefit of Provisional Patent Application Ser. No. 62/603,370 filed 2017 May 30, by the present inventors.

BACKGROUND OF THE INVENTION

The invention relates to line-of-sight optical communications. Prior art includes many examples fitting the general category. In a typical example, a first light emitter directs light toward a remote optical receiver. Near the receiver location, a second emitter directs light toward an optical receiver associated with the first emitter. First and second emitters are provided with a means of modulating the emitted light so that information is transmitted back and forth between first and second emitter locations. Additional features that are well known in the art include;
1) means of adjusting the direction of transmitting and receiving elements to achieve maximum bidirectional coupling efficiency,
2) use of a retro-reflector and means of modulating light passing through retro-reflector to eliminate the requirement for a second emitter, and
3) means of tracking the motions of one or both receiver locations to maintain high coupling efficiency in the presence of such motions.

When line-of-sight optical communications according to prior art is employed on moving platforms, certain deficiencies become evident;
1) means of stabilizing the platform is required in order to minimize loss of bidirectional tracking,
2) tracking failures occur frequently and require substantial time for re-acquisition,
3) distance measurement between communicating units is not continuously updated, and
4) platform vibration degrades signal quality.

Prior Art Background of Free Space Optical Devices

U.S. Pat. No. 6,381,055, "Transceiver positioning in free space optical networks", Joel Javit et. al. inventors, filed 16 Apr. 1998, describes free space optical network using a retroreflector as an alignment aid. Javit et. al. appropriately identify shortcomings of then current prior art; alignment of two or more communication units may be interrupted, necessitating a third communication unit to maintain information flow, difficulty of re-establishing communication if knowledge of a communicating unit is even slightly inaccurate, difficulty of establishing communication if a unit positioning system has inaccuracies, the necessity of mutually aligning communication beams of each unit with a communicating unit, and failure of a link search to converge in a practical time frame. Javit et. al. overcomes some of these limitations using a retroreflector return beam to quickly return a search beam that is pointed correctly. However, the solution taught by Javit et. al. still has limitations; knowledge of the retroreflector position is assumed, macro scale adjustments to a searching transceiver are required, large gimbals are used in the search method, and the search pattern is time consuming such that rotary motion of both communicating unit platforms during the search interval leads to joint acquisition failure. Because of these deficiencies, the art of Javit et. al. is inappropriate for formation of a broadband mobile network or a mobile platform community capable of control as a single unified system.

2015 Publication "Laser beam tracking for free-space optical communication on small-satellite platforms in low-Earth orbit", by Tam Nguyen and Kerri Cahoy describes the use of a ground based beacon to facilitate alignment of a communication unit mounted on a small satellites. The small satellite has low size, weight and power hardware capable of using the beacon to acquire and track the ground unit, establishing bidirectional communication. However, the beacon is mounted on a massive stabilized base, rendering the art of Nguyen and Cahoy inappropriate for multiple small platforms mutually communicating and thereby forming a mobile broadband network or a mobile platform community capable of control as a single unified system.

U.S. Pat. No. 9,366,938, "Electro-optic beam deflector device", Michael Anderson et. al. inventors, priority date 17 Feb. 2009, describes a small electro-optic scanner that rapidly searches a wide field of regard, leading to the capability of establishing broad band communications among multiple mutually communicating platforms. Related 11 Feb. 2016 publication "New Electro-Optic Laser Scanners for Small-Sat to Ground Laser Communication Links" by Scott R. Davis, Seth T. Johnson, Scott D. Rommel, and Michael H. Anderson (Vescent Photonics Inc., 4865 E. 41st Ave., Denver Colo. 80216) and Jimmy Chen and Tien-Hsin Chao (Jet Propulsion Laboratory, 4800 Oak Grove Drive, Pasadena Calif. 91109) describes the same small electo-optic scanner that rapidly searches a wide field of regard, leading to the capability of establishing broad band communications among multiple mutually communicating platforms. Davis et. al. describe an acquisition sequence in which a stable ground based system acquires an optical link to a satellite using prior knowledge. The use of a retroreflector return from remote communicating unit is not considered. Davis et. al. do not describe a system suitable for acquiring and tracking an optical communications link between two platforms that are both subject to dynamic motion caused, for example, by air turbulence or non-parallel flight paths. When the acquisition method described by Davis et. al. is applied to two moving and turning platforms, tracking convergence is delayed by an absence of certainty that platform 1 transmission has been received by platform 2 and vice versa. Further; the dwell time of platform communication beam encompassing platform 2 during a wide field of regard scan may be too short for meaningful communication, the convergence time from acquisition to reliable tracking may be long, and platform 2 may pass out of platform 1 field of regard before tracking and communication can be initiated. In contrast, the Through the Air Link Optical Component (hereinafter termed TALOC) acquisition is able to begin communication transmission with accurate pointing on a parallel beam with different wavelength instantly on receipt of the first retroreflector return. Transition from acquisition to tracking is also immediate, requiring only updates of the retroreflection based pointing information. If tracking is momentarily lost, tracking detector array history gives the TALOC system information about the direction in which platform 2 has strayed relative to platform 1 coordinates and vice versa.

None of the references cited describes a bidirectional communication system incorporating a retro-reflector to facilitate acquisition and tracking, being associated with at least a first and a second platform and utilizing a plurality of optical wavelengths to establish tracking, acquisition, and communications. Further, none of the references cited describes a bidirectional communication system incorporating a retro-reflector to facilitate acquisition and tracking, and being associated with at least a first and a second platform, and utilizing a plurality of optical wavelengths to establish tracking, acquisition, and communications, further incorporating features selected from the following group:

- Location of the communication light spot on the communication detector array gives confirmation and improvement of the tracking data
- Solid state means for acquisition and tracking functions
- Modulated tracking light to convey information
- Modulated communications light to convey information, including identification and status of the transmitting TALOC unit.
- Controlled shape and direction of acquisition beam
- System elements converting electronic signals to system level information
- Detector array on first platform that determines the direction, relative to a coordinate system fixed to first platform, of second platform retroreflector using information derived from knowledge of the portion of said first platform controlled first light beam shape associated with detector array element illuminated by retroreflector return light and information derived from knowledge of the first light beam direction when retroreflector return light is detected
- focal plane detector array that converts detected modulated second beam light to an information bearing electronic signal
- Bringing centermost elements within detector array into the illumination of beam return by means of optical beam scanning elements
- Electronic processor capable of converting electronic signals to system level information that derives
  - information equivalent to polar coordinates azimuth angle that identifies said second platform direction relative to first platform using a measurement of time when retroreflected beam returning from second platform is detected and associating measured time with a known relationship between azimuth scan angle and time
  - information equivalent to polar coordinates elevation angle that further identifies said second platform direction relative to first platform using identification of the particular element within first platform associated detector array that is illuminated by retroreflector light returning from second platform,
  - relative distance between first and second platforms using a measurement of elapsed time between transmission of a light pulse from first platform and detection of retroreflected return beam from second platform and using the known relationship between elapsed time and distance traversed by a pulse traveling at the speed of light
- Superluminescent Light Emitting Diode used to emit and modulate light,
- A laser used to emit light
- Means of limiting emitted light to levels that are eye-safe
- Optical filters that transmit a narrow band around emitted light wavelength and prevent unwanted background light from interfering with the performance of detectors,
- Spurious signal reduction using, for example
  - time domain demultiplexing,
  - bit pattern decoding,
  - bit rate demultiplexing
  - carrier frequency demultiplexing,
  - wavelet decoding
- Video camera that provides information complementary to the communication information
- A multi-directional communication system associated with a plurality of platforms, each of which may serve as the location for a plurality of subsystems communicating with other platforms in pairs
- Electronic processors capable of converting electronic signals to system level information are also capable of interconnecting across a plurality of platform pairs to constitute a distributed mobile network and thereby form a mobile platform community having processing capabilities beyond the scope of any single one of said electronic processors capable of converting electronic signals to system level information.
- A mobile platform community that operates as a subsystem within a larger system selected from the group consisting of:
  - a plurality of satellites maintaining a desired relative and absolute alignment,
  - a plurality of ground vehicles operating safely and autonomously,
  - a plurality of air vehicles operating safely and autonomously,
  - a virtual reality model of said mobile platform community incorporating accurate positions, orientations, and velocity vectors of all platforms comprising the community, determined relative to a coordinate reference associated with one of the community platforms,
  - a virtual reality model of said mobile platform community incorporating accurate positions, orientations, and velocity vectors of all platforms comprising the community, further incorporating location of a remote station,
  - a phase array antenna that uses known locations of all platforms comprising said mobile platform community to generate in-phase bidirectional radio frequency signal transmission between said mobile platform community and said remote station,
  - a plurality of unpiloted airborne vehicles,
  - a plurality of piloted airborne vehicles,
  - a spacecraft engaged in docking maneuvers,
  - a spacecraft convoy group,
  - a plurality of communicating spacecraft,
  - an aircraft landing on an airborne carrier,
  - an aircraft landing on an ocean carrier,
  - an aircraft landing on a ground based runway,
  - unpiloted airborne vehicles conducting coordinated missions,
  - guidance of a moving vehicle external to said mobile platform community to a predetermined end point,
  - processor integrating knowledge of mobile platform community locations with camera data to create a composite image of selected scenes, and
  - systems that cooperate with human and/or robotic responders to evacuate casualties and convey them safely to emergency care facilities.
  - ground vehicles capable of at least one of
  - situation awareness leading to collision avoidance,
  - convoy,
  - automated driving processor maintaining optimum emitter power to prevent detector saturation as range between platforms shortens Emitter and detector arrays that address an entire field of regard, thereby reducing the need for scanning, scanning based on beam deflection using electro-optic effect Scanning based on a single moving part that positions an emitted beam along two axes, Scanning that reduces the number of required array elements by moving micro-lens array relative to array, Separation of light beams used in communication function from those used in acquisition function using wavelength division multiplexing, Waveguide array sandwiches in which alternating layers are devoted to transmitting and receiving light, Electro-optics that switch light between alternating interleaved waveguide array layers devoted to transmitting and receiving light, and holographic optical element performing at least one of the following functions;
concentrating or dispersing light in place of or as an adjunct to bulk lens,
wavelength division multiplexing,
modification of field of regard

PRIOR ART REFERENCES CONSIDERED TO BE MOST PERTINENT TO THE PRESENT INVENTION ARE CITED BELOW

U.S. Patent Documents

U.S. Pat. No. 6,381,055, 16 Apr. 1998, Javit et al
U.S. Pat. No. 9,954,612, 6 Dec. 2017, La Fata
U.S. Pat. No. 9,825,701, 12 Oct. 2015, Juarez, et al
U.S. Pat. No. 9,813,151, 4 Aug. 2015, Kingsbury, et al
U.S. Pat. No. 8,224,189, 2 Feb. 2007, Frolov
U.S. Pat. No. 7,612,329 B2, Nov. 3, 2009, Chalfant, III, et al.
U.S. Pat. No. 8,160,452 B1, Apr. 17, 2012, Chalfant, III, et al.

Publications

1988 Publication, K. S. Shaik, "Atmospheric Propagation Effects Relevant to Optical Communications", NASA Communications Systems Research Section, TDA Progress Report 42-94, 2015 Publication, "Laser beam tracking for free-space optical communication on small-satellite platforms in low-Earth orbit", by Tam Nguyen and Kerri Cahoy 2016 Publication, "Eye-safe diode laser Doppler lidar with a MEMS beam-scanner", Qi Hu, Christian Pedersen, and Peter John Rodrigo, Vol. 24, No. 3 | DOI:10.1364/OE.24.001934 | OPTICS EXPRESS "New Electro-Optic Laser Scanners for Small-Sat to Ground Laser Communication Links", Scott R. Davis,* Seth T. Johnson, Scott D. Rommel, and Michael H. Anderson, Vescent Photonics Inc., 4865 E. 41st Ave., Denver Colo. 80216, FSO Proceedings 1999 Publication, 4 B. Strickland, M. Lavan, E. Woodridge, V. Chan, "Effects of fog on the bit-error rate of a free space laser communication system," Applied Optics/Vol. 38, No. 3/20 January, 424-431, (1999).

1997 Publication, 5 I. Kim, H. Hakakha, P. Adhikari, E. Korevaar, "Scintillation reduction using multiple transmitters," Free-Space Laser Communication Technologies IX, G. S. Mercherle, ed., Proc. SPIE 2990, 102-113 (1997).

2017 Publication, "EO-based beam-steerable free-space optical communication link for reconfigurable wireless data center", Proc. SPIE 10128, Broadband Access Communication Technologies XI, 1012805 (Jan. 28, 2017);

2003 Publication, NAVAL POSTGRADUATE SCHOOL, MONTEREY, CALIFORNIA, THESIS, FREE SPACE OPTICS COMMUNICATION FOR MOBILE MILITARY PLATFORMS by Soo Sim Daniel Neo, December 2003

2015 Publication, Development of a Pointing, Acquisition, and Tracking System for a Nanosatellite Laser Communications Module, Kathleen Riesing, Kerri Cahoy, September 2015 SSL #19-15

SUMMARY OF THE INVENTION

TALOC is a low Size, Weight, and Power (hereinafter termed SW&P) optical communications device that:

Acquires and maintains a broad band communications link between two platforms in line of sight with one another Measures azimuth and elevation angle relative to each platform reference from one TALOC to the communicating TALOC and vice-versa Measures distance between communicating TALOC units Sees through atmospheric disturbances (clouds/fog)

These remarkable functions open the door to several important derivative capabilities, discussed below.

TALOCs preferably operate in the Near Infrared (NIR) at a wavelength that has low moisture absorption, enabling high transmission through clouds, fog, and high humidity areas.

TALOC has two operating modes; acquisition/tracking and communications. Azimuth and elevation scan axes are interchangeable and need not be fully orthogonal to one another, provided that they are not parallel. For acquisition/tracking, a first TALOC unit makes a rapid wide angle azimuth only scan, directing a wide fan of light into a field of regard in elevation. A stationary retro-reflector placed close to a second TALOC unit returns a momentary flash of light when the first TALOC light fan passes. The first TALOC detects the retro-reflector flash on a two dimensional tracking detector array and obtains two essential pieces of information:

Azimuth angle derived from detector array column in which the retroreflector flash is detected Elevation angle derived from the detector array row in which a light flash is detected Using the two angle data from single azimuth scan, TALOC moves immediately to tracking mode. The acquisition beam moves to the angle pair at which a light flash was detected. When retro-reflected light is detected in the tracking detector array, logic initiates servo tracking of retro-reflection in azimuth and elevation and a broad band optical communications emitter directs communications data from the first TALOC in the direction of the second TALOC unit. The communicating TALOC unit has a light fan source that produces pointing information from an acquisition/tracking two-dimensional focal plane array operating in the same way as the first TALOC. Bidirectional communication optical data transmission includes handshake data that confirms the identity of communicating units. After retro-reflector angle tracking begins in a first TALOC, light pulses are transmitted from which range to the second unit is extracted based on time of flight. Thereafter, range is continuously tracked. Given range awareness, timing of data bursts is readily set to avoid crosstalk among emitted light, retro-reflected light and light signals transmitted from the communicating TALOC units. Use of different wavelengths for acquisition/tracking and communication affords an alternative means to reduce crosstalk.

TALOC is ideally suited to several applications, including; docking, aerial refueling, interlinks among members of an Unpiloted Airborne Vehicle (hereinafter termed UAV) swarm, assisted or automated carrier ship landing by fixed wing aircraft or helicopters, communication among spacecraft in close orbits, semi-automated battlefield casualty extraction, and formation of mobile broadband optical networks.

When used in a docking and aerial refueling applications, the operational sequence is;
1) mutual acquisition and bi-directional communications initiates between host and daughter vehicle,
2) guidance input from TALOC during approach to docking port includes relative range, angles and closing velocity,
3) fine positioning at close range facilitates attachment of docking mechanism to vehicle.

In the case of aerial refueling, a guided fuel receptor takes the place of a docking daughter vehicle and a guided fuel dispenser takes the place of a host vehicle.

An important advantage of TALOC in applications such as docking and aerial refueling where relative range may vary from kilometers to centimeters is the ability to reduce emitter power as range reduces, thereby avoiding saturation of detectors, an effect that typically renders LIDAR useless at close range.

Interlinks among mobile platforms such as UAV swarms or aggregations of ground vehicles enable accurate calculation of relative location and orientation of every platform in a local area. Situation awareness generated from sensor fusion may be hosted in a mobile distributed broadband network resident on the TALOC equipped mobile platforms. TALOC mediated communications within a mobile platform group and linking external sources allows operation of mobile platform swarms acting as a single controlled entity. Coordinated swarm control may be extended to provide teleoperation or automation of individual constituent platforms. Self driving cars are an important example of potential mobile platform coordinated control. Vehicles use TALOC as a broadband medium to relay traffic conditions back to incoming vehicles in real time, allowing proactive measures to avoid accidents.

Another important TALOC application is communication among space vehicles in close orbits where TALOC enhances mutual position awareness and facilitates convoy missions.

Carrier ship landing uses TALOC measurements and communication to create a common model shared between ship and approaching aircraft that shows an optimal and actual glide path with pilot guidance inputs to restore optimal approach. The same information could be used to assist automated landing.

Semi-automated casualty extraction is facilitated by the use of TALOC unit placed at the casualty site that guides incoming extraction vehicle and provides real time reporting of the extraction process as it unfolds, leading to timely and accurate in-transit care and most rapid conveyance to emergency care facility.

High data rate data transfer among mobile platforms leads to formation of mobile broadband optical networks. These networks, in turn, support sensor fusion and expert system development of actionable information in real time while a mobile platform community is approaching a remote site.

Each TALOC unit is comprised of several Commercial-Off-The-Shelf (hereinafter termed COTS) components working in conjunction with custom beam steering, light guide optics, and detector array to provide system functionality. COTS components typically include:
  Superluminescent Light Emitting Diode (hereinafter termed SLED) Infrared (hereinafter termed IR) transmitter
  Retro-reflector
  Lenses
  Optical Window Wavelength of operation ranges from visible to long wave IR; typical operating wavelength is 2.0 micrometers. 1.55 micrometers is another candidate wavelength for which commercial parts are readily available. Typical communication bit rate is 1 Gbps. Achievable communication bit rate is more than one Terahertz. Typical emitter output power is 0.5 Watts. Typical detector array is 200×800 pixel rectangle on 20 mm×40 mm substrate. Typical retro-reflector is 20 mm diameter corner cube. TALOC volume envelope target is 30×150×120 mm. Weight target is 1 Kilogram. Power consumption target is 20 Watts. Discrimination against sunlight and other background light that tends to reduce signal-to-noise in signal processing may be provided in the form of:
1) optical filter in front of retro-reflector having optical bandpass matching emitter wavelength,
2) optical filter in front of detectors having optical bandpass matching emitter wavelength,
3) electronic filters such as time domain, bit pattern, bit rate, carrier frequency or wavelet encoding.

The characteristics of TALOC are important because they are needed to support broad band communication and awareness of precise platform locations in a mobile platform aggregation. Such communication and position awareness is important in turn because it is a precondition for forming the mobile platform aggregation into an expert system with advanced capabilities. Such a mobile platform aggregation formed into an expert system will hereinafter be referred to as an autonomous mobile platform community.

An autonomous mobile platform community may be characterized as an expert system having a knowledge base and an inference engine, both distributed among processors residing on individual platforms.

The autonomous mobile platform community knowledge base comprises:
  Comprehensive intelligence loaded into all platform processors prior to initiation of a mission assigned to the community
  3-Dimensional terrain map covering the community vicinity
  Known objects of interest and reference points identified in terrain map
  Anticipated locations of external resources such as satellite, cell towers and supervisory control stations
  Synchronized time reference carried on each platform and communicated to external assets
  Micro camera array and other sensor data shared among communicating platforms
  A baseline top level inference engine scenario is:
  Engage TALOC link on all platforms to develop a range and angle matrix from each platform perspective
  Solve matrix equations to determine a platform community map with each platform located to high precision
  Exercise calculated relative locations to establish phase array Radio Frequency (hereinafter termed RF) communication within platform community
  Locate and establish RF communications with 2 or more external point sources Derive absolute position and heading of overall platform community from external reference points Compare platform community self-awareness with initially downloaded knowledge base to establish correlations and build confidence in a consensus situation awareness Advantages Platform communities to which the TALOC based inference engine is applicable include:
UAV military mission groups that take off and land on an airborne carrier
UAV mission groups utilizing autonomous operation and flight control
Ground vehicles in an automated traffic control environment
Space platforms cooperating in docking and reconfiguration exercises
Automation of aircraft landing on an ocean aircraft carrier or ground station
Terminal guidance of munitions using situation awareness on surveillance aircraft and TALOC enabled optical or RF communications
Mobile phase array antennas
Semi-automated casualty extraction and support of transit to emergency care facility These and other important applications of autonomous mobile platform communities rely critically on rapid convergence of the knowledge base toward actionable situation awareness that flows from platform community inter-communications, starting with the TALOC units.

The TALOC design provides for rapid acquisition and seamless passage from acquisition to fine tracking. In the event that turbulence or rapid platform maneuvers cause tracking loss, tracking is restored within a fraction of a second by following the original acquisition sequence.

TALOC emitters may comprise a plurality of emitter elements that direct light beams toward a plurality of separate remote platforms.

Other advantages of one or more aspects of the invention will be apparent from a consideration of the drawings and ensuing description.

BRIEF DESCRIPTION OF THE DRAWINGS

The drawings and figures incorporated within this document are.

DETAILED DESCRIPTION OF THE INVENTION

The term "platform", as used in this description and accompanying claims, shall be defined to mean a physical structure that carries one or more TALOC units and has a defined coordinate system for determining azimuth, elevation and distance to a remote object. Unless explicitly described otherwise, alternative preferred embodiments may have like components and features in common.

Figure 1:
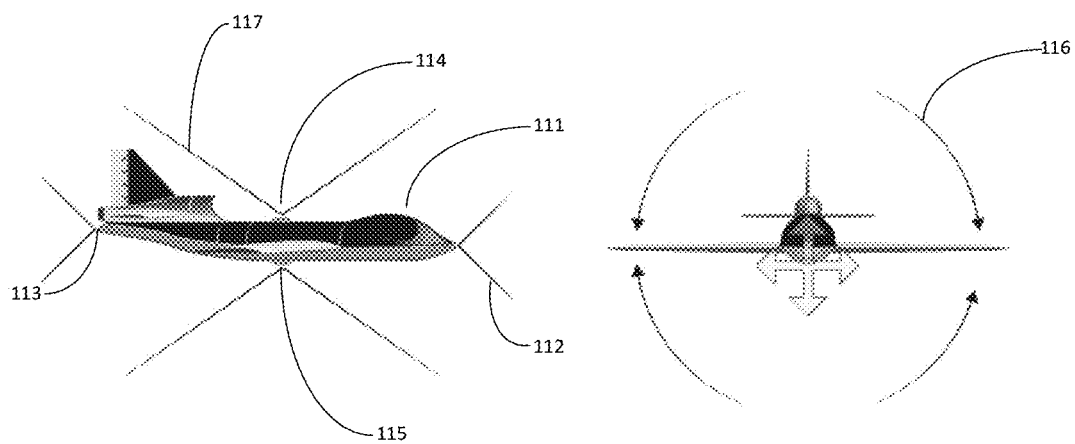
FIG. 1 shows a representative mobile platform, in this case a UAV, having TALOC units mounted to top, bottom, front, and back.

Preferred embodiment A of the invention is illustrated in FIG. 1, in which a platform 111 according to the invention takes the form of a UAV. TALOC units are mounted to the front 112, back 113, top 114 and bottom 115 of platform 111. The top and bottom TALOC units incorporate beam scanning means to address a field of regard in elevation over a range of angles 116 degrees. In preferred embodiment A, angle 116 may be assigned a design value up to 180 degrees. The field of regard in azimuth is angle 117 degrees. In preferred embodiment A, angle 117 may be assigned a design value from 90 degrees up to 180 degrees. The top 114 and bottom 115 TALOC units, considered together, may cover a full 360 degrees in elevation around the central platform axis. Front 112 and back 113 mounted TALOC units, in cooperation with top 114 and bottom 115 TALOC units, may provide sufficient angular coverage to enable at least one TALOC to make an optical line-of-sight connection in any direction around the platform.

FIG. 2 shows optical elements of a first communicating TALOC unit 121 in preferred embodiment A.

Figure 2A:
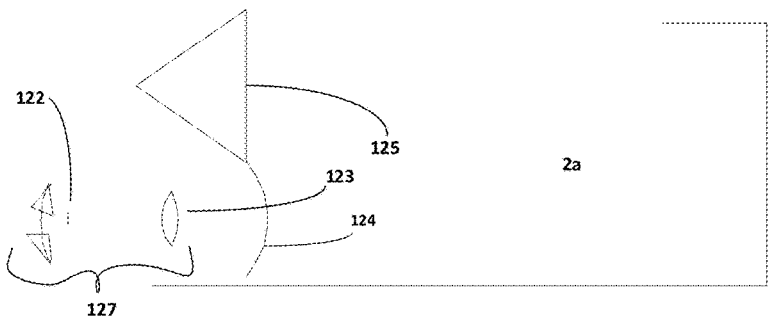
FIG. 2a shows optical elements in a TALOC concept, preferred embodiment A, diagram in a side view.
Figure 2B:
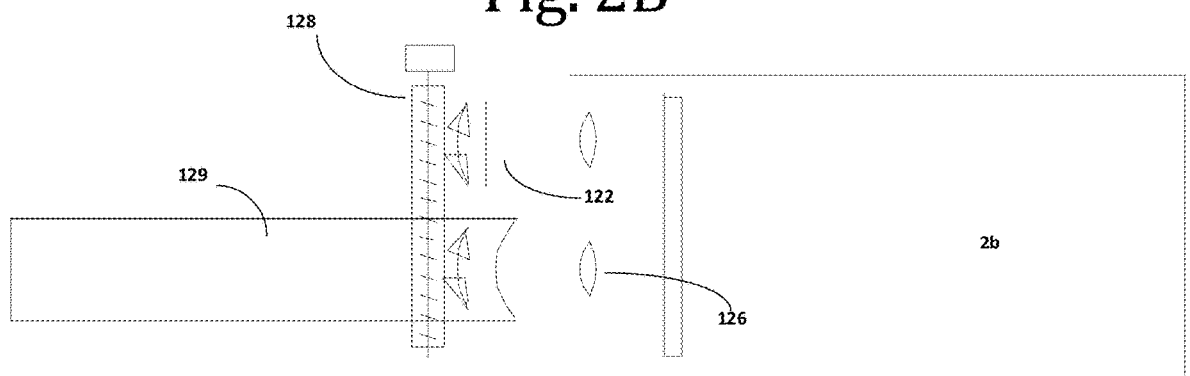
FIG. 2b shows optical elements in a TALOC concept, preferred embodiment A, diagram in a top view.

Side view in FIG. 2a shows elevation scan of a focal plane array 122. Detector lens 123 and array 122 scan together in a connected assembly 127 and the scan axis is centered on detector lens 123, which is located at the center-of-curvature of a cylindrical window 124. Stationary retro-reflector 125 is located above elevation scanning assembly 127. FIG. 2b, a top view of TALOC unit 121, shows focal plane array 122, said connected assembly 127 further comprising emitter lens 126, azimuth scanning means 128, and polymer waveguide optical line source 129. Focal plane array 122, azimuth scanning means 128, detector lens 123, emitter lens 126, and line source 129 are mounted on elevation scanning assembly 127. Light detected at different positions along focal plane array 122 as seen in FIG. 2b originates from different azimuth angles. Azimuth scanning means 128 drives in parallel; 1) subassembly comprising focal plane array 122 and detector lens 123, and 2) subassembly comprising line source 129 and emitter lens 126. Elevation scan working in cooperation with azimuth scanning means 128 provides two axes of direction control for transmission and detection of optical signals. In the preferred embodiment of FIG. 2b, azimuth scanning means 128 takes the form of a lead screw. Light from the line source 129 passes through lens 126, forming a fan of light. In a single elevation scan, light passes across everything within range and within an overall field of regard defined by azimuth range produced by light fan and elevation scan range.

Figure 3:
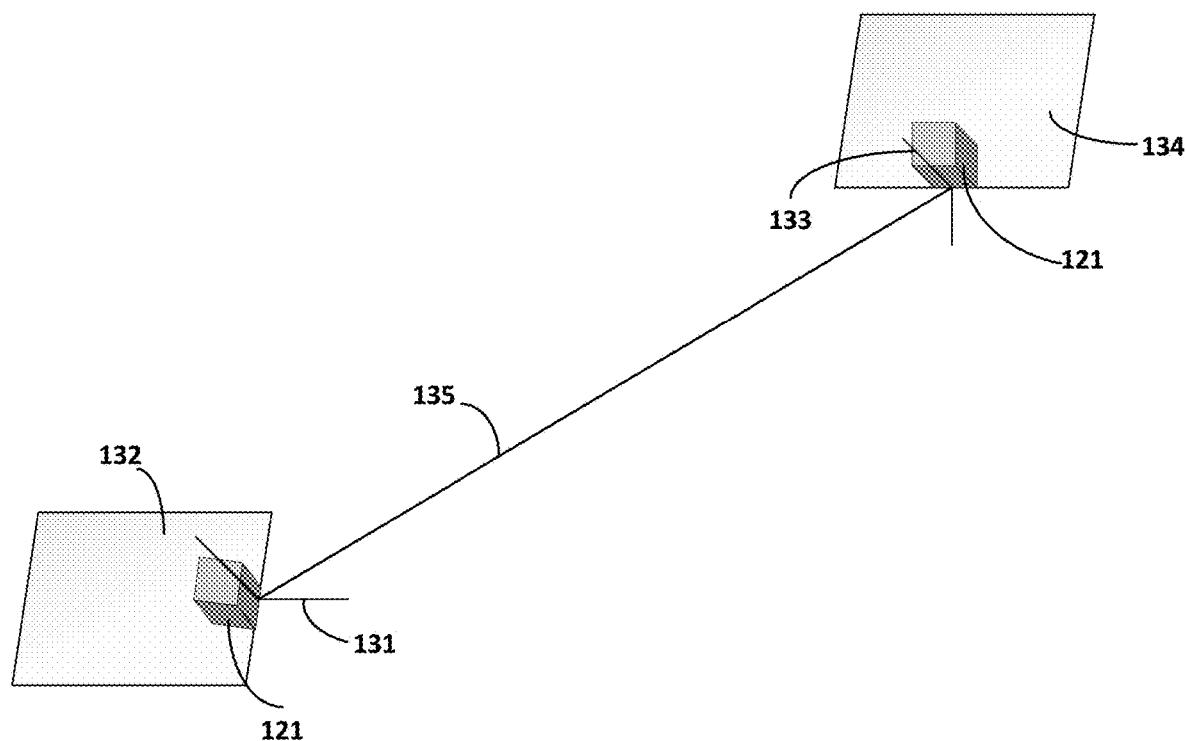
FIG. 3 shows azimuth, elevation and distance measured by a pair of communicating TALOC units.

FIG. 3 shows two angle measurement reference coordinates 131 for first platform 132, two angle measurement reference coordinates 133 for second platform 134, and distance 135 measured by a pair of communicating TALOC units. Taking first platform 132 as a reference, second platform 134 orientation is fully determined by the two angle measurement performed by second platform 134 mounted TALOC. Retro-reflector 125 on second platform 134 mounted TALOC, will produce reflected light directed back to the first platform 132 mounted TALOC. First platform 132 mounted TALOC focal plane array 122, having an elevation direction of regard equal to the line source 129 emitted beam elevation angle, will be in position to detect retro-reflected light. The position of a momentary light flash along the focal plane array 122 as seen in FIG. 2*b* indicates a second platform mounted retro-reflector azimuth angle. An encoder continuously measures the elevation scan angle. Encoder reading correlated with the momentary retro-reflection flash indicates second platform retro-reflector elevation angle. Upon detection of retro-reflection and determination of retro-reflector angle pair, logic associated with first platform 132 mounted TALOC directs servo tracking of the second platform 134 mounted retro-reflector in two angles. Acquisition and tracking of platform 1 mounted TALOC by second platform 134 mounted TALOC proceeds in identical fashion to acquisition and tracking of second platform 134 mounted TALOC by first platform 132 mounted TALOC.

Figure 4:
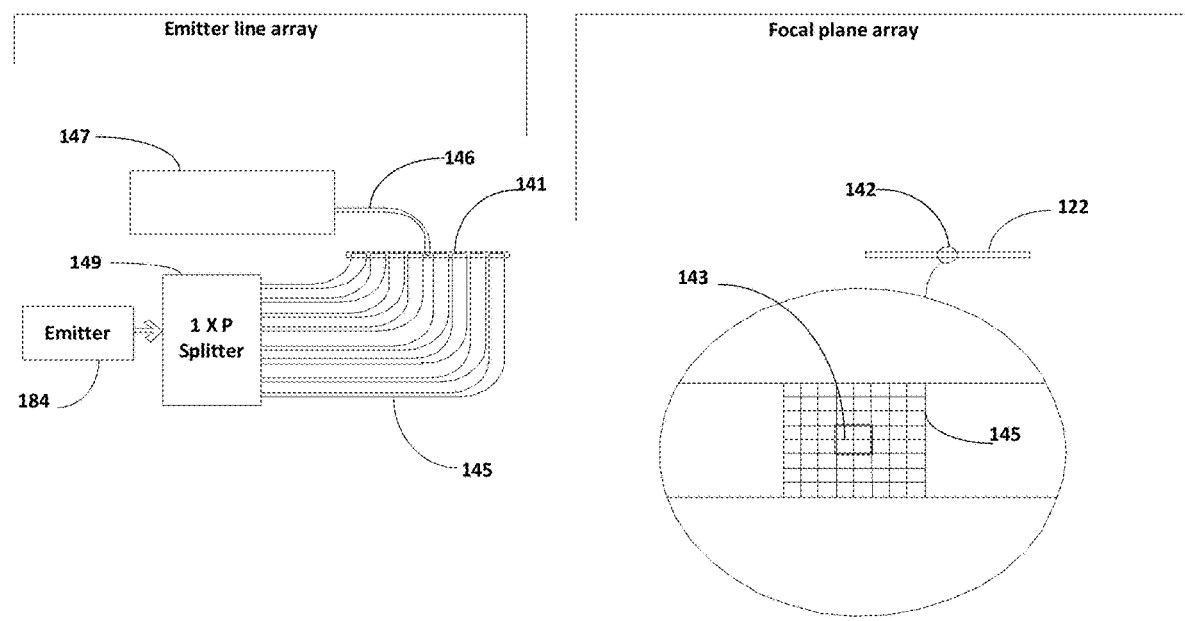
FIG. 4 shows detector array and light distribution elements of TALOC optics.

FIG. 4 shows details of line emitter 141 and focal plane array 122 in preferred embodiment A. Along with elevation tracking, an azimuth scan of focal plane array 122 and line emitter 141 in unison is initiated in order to bring detected retro-reflection to the center zone 142 of the focal plane array 122. When retro-reflected light is detected in the center zone 142, logic initiates servo tracking of retro-reflection in azimuth while continuing the elevation tracking. Fine tracking is enabled by providing, in center zone 142, a rectangular array 145 extending approximately N pixels in elevation by M pixels in azimuth where each pixel reads out at high speed and all rectangular array 145 pixels are connected in parallel to assure highly responsive 2 axis tracking feedback. M and N may each take a value in the range 2 to 100. The centermost 4 pixels 143 are configured electronically for broad band communications receiving. Adjacent to a center pixel in line emitter 141, a single optical waveguide 146 directs transmitted light from broadband communications emitter 147 toward lens 126. Acquisition/tracking emitter 148 directs acquisition/tracking light to a 1 by P splitter 149 that inputs light to each of P waveguides in line emitter 141. P may take a value from 8 to 1024.

Optical fiber 146 directs communications data from the TALOC toward communicating platform 134 retro-reflector. Timing of transmitted data bursts is set to avoid fratricidal blanking of detected signal retro-reflected from communicating platform 134 by high power emitted light. A non-blanking time interval is also reserved for detection of optical transmission originating from a communications data laser on the communicating platform 134. The communicating platform 134 carries an identical TALOC unit having a light emitter that derives pointing information from a scanning and tracking line focal plane array operating in the same way as the first platform 132 TALOC acquisition scan and tracking. Bidirectional optical data transmission includes handshake data that confirms the identity of communicating platform. After retro-reflector angle tracking begins in TALOC, short pulses are transmitted from which range to communicating platform is extracted based on time of flight. Thereafter, range is continuously tracked. Given range awareness, timing of data bursts is readily set to avoid crosstalk among emitted light, retro-reflected light and laser signals transmitted from the communicating platform 134.

The second axis scan may be avoided by providing a linear emitter and detector array that covers the entire second axis scan angle. A single lens may be used for acquisition/tracking and communication by providing a wavelength selective beam splitter in which one optical path is devoted to retro-acquisition and tracking and a second optical path with a different wavelength is devoted to broadband communications.

One may use a flexible waveguide array 144 to carry emitted light from a displaced location to the lens 126 object plane. Using flexible waveguide array 144 allows using a microlens array to enable rapid beam scanning where the movable microlens directs emitter light to a selected flexible waveguide entrance port.

Splitting the transmitted and receive light paths at a given wavelength may be accomplished by placing planar waveguides in close proximity facing the lens focal plane. The waveguide array 144 associated with emitted light may be sandwiched between two or more receiving waveguide arrays.

Controlling the refractive index in front of planar waveguides with an electro-optic device allows switching between connection to emitters and connection to detectors.

Figure 5:
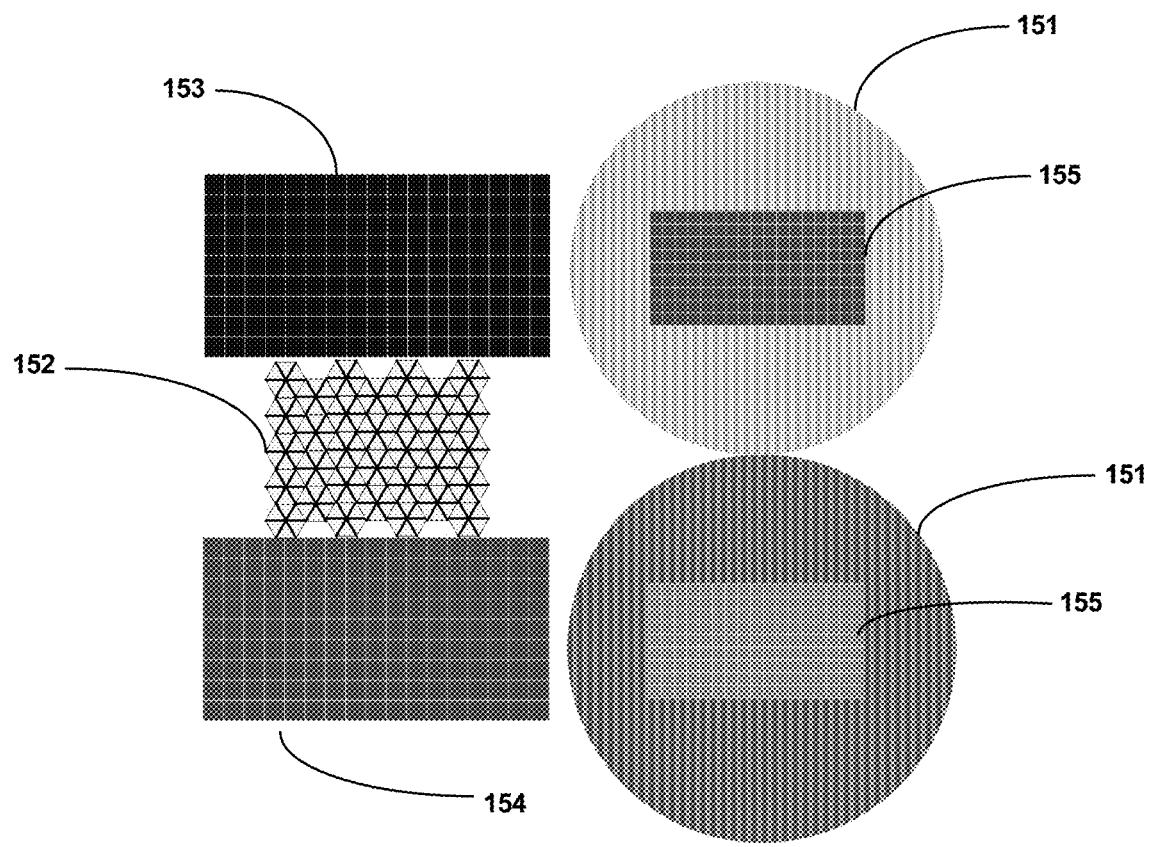
FIG. 5 shows preferred embodiment B utilizing Holographic Optical Elements for both laser transmitter optical components and receiver optics

FIG. 5 shows, in preferred embodiment B, TALOC utilizing Holographic Optical Elements (hereinafter termed HOE 151) for both laser transmitter optical components and receiver optics 155. Acquisition/tracking beam transmitter direction is controlled using electro-optic scanner 153. Communication beam transmitter direction is controlled using electro-optic scanner 154. Transmitter laser output collimation and beam shape can be controlled through the use of one or more HOE 151, tailoring beam shape and aperture size to individual platform requirements. Large area receiver optics utilizing HOE 151 eliminate significant weight and can provide SNR advantages by maximizing useful aperture for a given field of regard. The use of wavelength selective HOE 151 in retro-reflectors not only realizes significant weight savings over glass cubes, it incorporates the unique ability of diffractive optics to operate at a narrow design wavelength range, preventing retroreflection at other wavelengths and thereby reducing spurious optical signals. System performance is a strong function of retroreflector diameter. An HOE 151 facilitates providing the desired aperture without an undue weight penalty. Area to weight ratio is further increased by providing a retroreflector array 152 instead of a single large area retroreflector 125.

Figure 6:
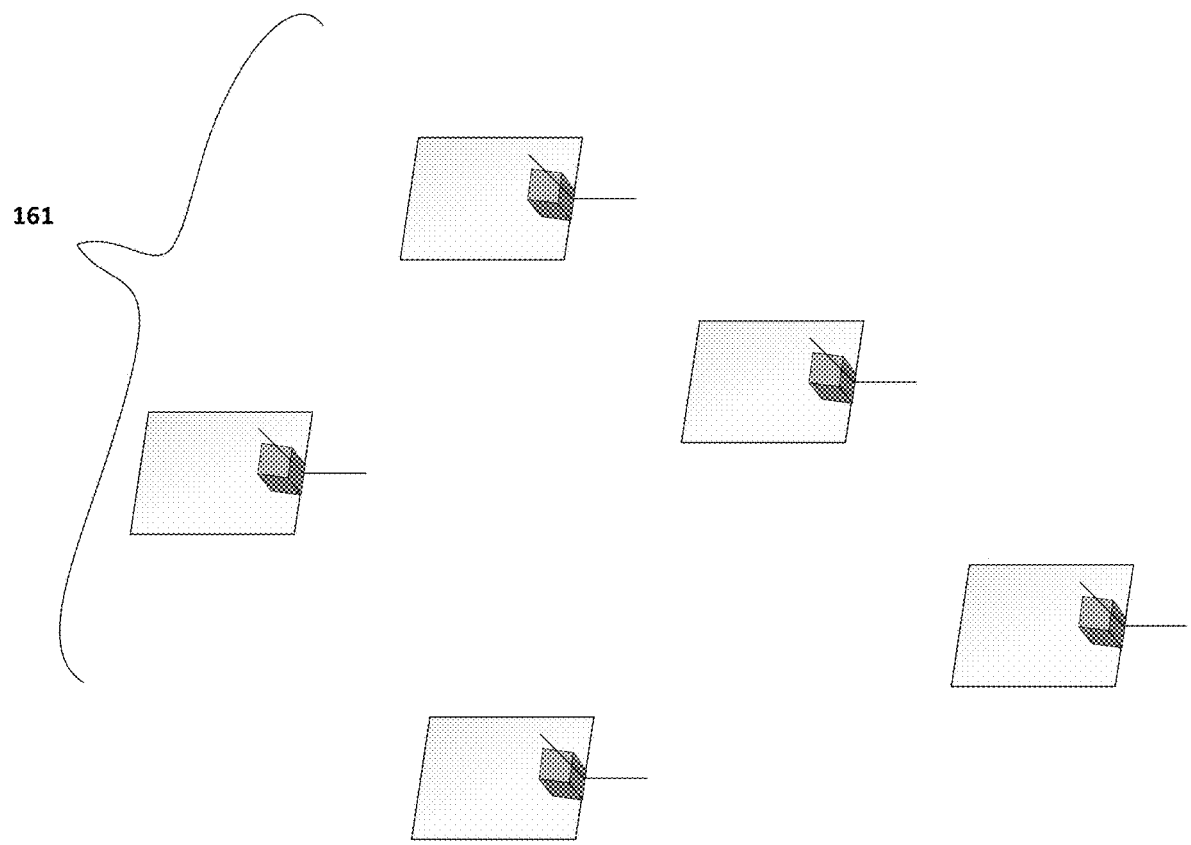
FIG. 6 shows representative locations of platforms in a mobile platform community.

FIG. 6 shows representative locations of platforms in a mobile platform community. When four or more platforms 161 are mutually connected by TALOC units and the platforms 161 are not all coplanar, all six degrees of freedom of all platforms are fully constrained by TALOC measurements and the reference frame of any platform can be used as a universal reference frame for all platforms in the community.

Figure 7:
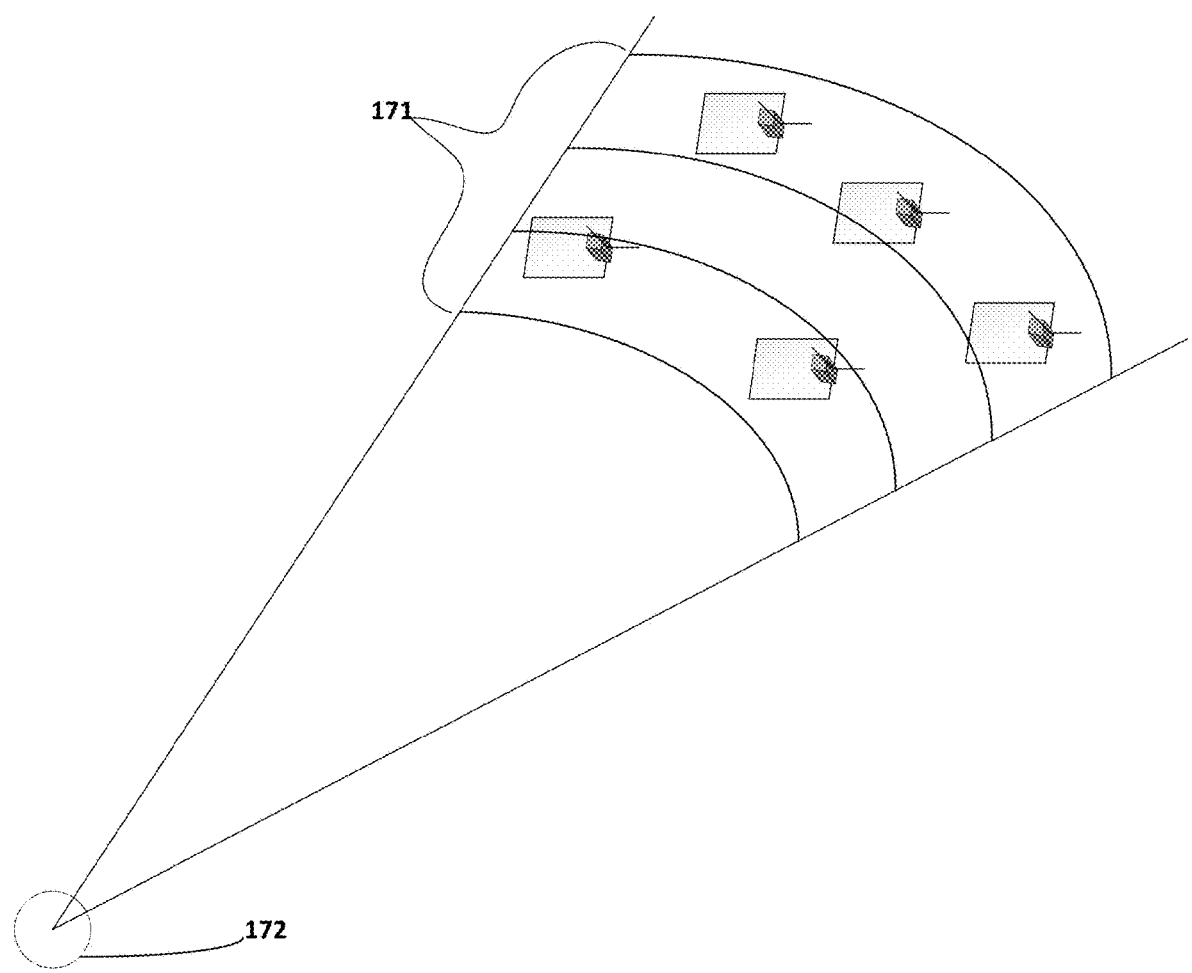
FIG. 7 shows a representative mobile platform community formed into a phase array antenna.

FIG. 7 shows a representative mobile platform community formed into a phase array antenna 171. Phase array antenna 171 formation begins with synchronized time measurement at each platform in a community. A known seed message is transmitted from a source 172 external to the platform community. Seed message time of arrival at each platform is measured. Arrival time data is used to compute a relative phase of the seed message at each platform. The seed message is retransmitted by each platform with relative phase reversed. The combined retransmissions form a beam that is in phase back at the original seed message transmitter. By this process, the platform community has become a phase array transmitting antenna 171 with in-phase condition set for communication from platform community to external seed message source. Any signal may be transmitted in this manner provided the measured relative phase values are retained. Transmitting to locations other than the original seed message source entails proportional changes in relative phase with distance transverse to the seed message transmission. Refocusing phase array transmission is also possible by changing the radius from which in-phase signal transmissions are measured. As the platform community moves away from its original configuration, adjustments to the relative phase values of each platform must be made. These adjustments are calculated from periodic re-transmission of seed messages.

In order to use the platform community as a phase array receiving antenna 171, the seed message is relayed from each platform to a central host platform along with synchronized time reference using TALOC units and retransmission from one platform to the next. The start times of all received signals are aligned and the signals are added in phase in a central host platform signal processor.

Formation of phase array antenna 171 provides a means of concentrating transmitted power and thereby mitigating the effect of jamming and providing a degree of covert protection to RF transmissions from the platform community.

Brassboard Electronics

Figure 8:
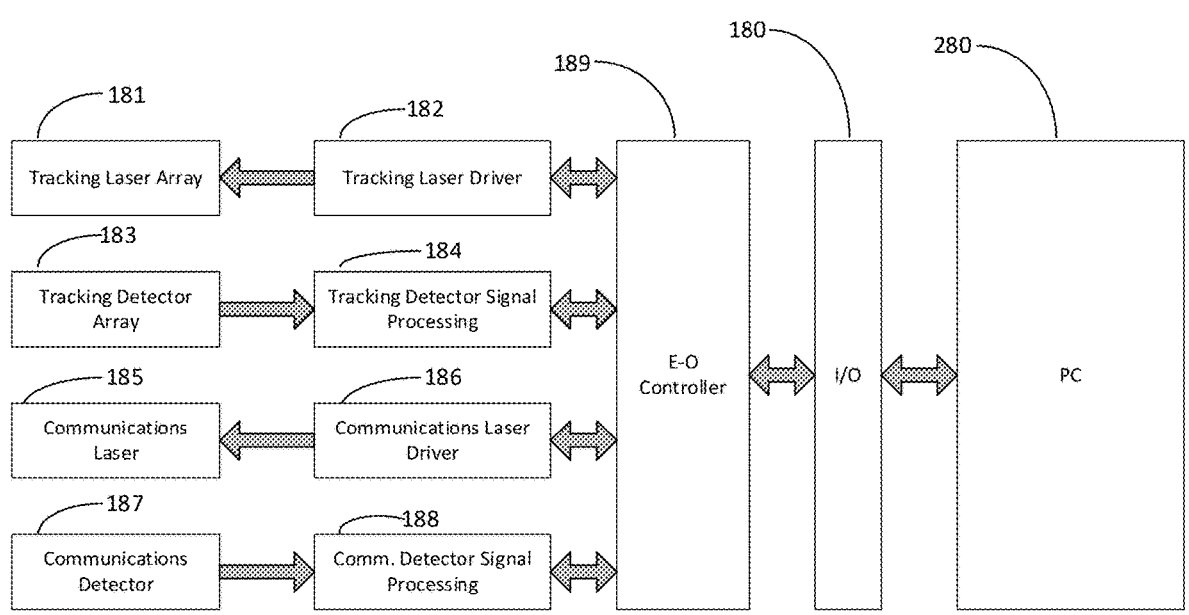
FIG. 8 shows the brassboard electronics block diagram for preferred embodiment C

The brassboard electronics block diagram for preferred embodiment C is shown in FIG. 8 below. Elements shown include: tracking laser array 181, tracking laser driver 182, tracking detector array 183, tracking detector signal processing 184, communications laser 185, communications laser driver 186, communications detector array 187, communications detector array signal processing 188, electo-optics controller 189, input/output interface 180, and onboard microprocessor 280, As shown, onboard microprocessor 280 controls the operation of all elector-optics elements via mediation of input/output interface 180 and electo-optic controller 189.

Link Budget:

TALOC operates simultaneously in two modes; acquisition and communication. Link budget must be calculated separately for each mode because acquisition entails round trip optical propagation and the required detection bandwidth is different for the two modes. Parameters used in the link budget calculations are shown in Table 1 below.

TABLE 1

| Link Budget Parameters | | | |
| --- | --- | --- | --- |
| Value | Units | Symbol | Identification |
| 7.85E−04 | Watts (W) | EPW | Acquisition emitted power, Watts |
| 5.00E−02 | radians | ABCA | Acquisition beam full cone angle |
| 2.50E−02 | radians | CBCA | Communication beam full cone angle |
|  | meters | R | Range |
| 1.00E+02 | Hz | ASB | Acquisition signal bandwidth |
| 1.00E+09 | Hz | CSB | Communication signal bandwidth |
| 1.00E−14 | W*RT(HZ) | ADNEP | Acquisition detector NEP |
| 1.00E−14 | W*RT(HZ) | CDNEP | Communication detector NEP |
| 4.00E−02 | meters | RD | Retro diameter |
| 2.00E−02 | meters | ADAD | Acquisition detector aperture diameter |
| 2.00E−02 | meters | CDAD | Communication detector aperture diameter |
| 1.55E−06 | meters | LAMBDA | Wavelength |

TABLE 1-continued

| Link Budget Parameters | | | |
| --- | --- | --- | --- |
| Value | Units | Symbol | Identification |
| 4.00E−01 | fraction | AOT | Acquisition optical elements transmission |
| 7.00E−01 | fraction | COT | Communication optical elements transmission |
|  | constant | BDP | Beam dispersion parameter |
|  | exponent term | AAP | Atmospheric absorption parameter |
| 1.00E−03 | meters | AED | Acquisition emitted beam diameter |
| 1.00E−03 | meters | CED | Communication emitted beam diameter |
| 100E−03 | W/cm$^2$ | EYEL | Eye safe power density limit at 1550 nm [1] |
| 5.00E−01 | fraction | ADC | Acquisition duty cycle |
| 1.00E−01 | fraction | CDC | Communication duty cycle |
| 7.85E−04 | W | CEP | Communication emitted power, Watts |

[1] American National Standard for Safe Use of Lasers, ANSI Standard Z136.1

Figure 9:
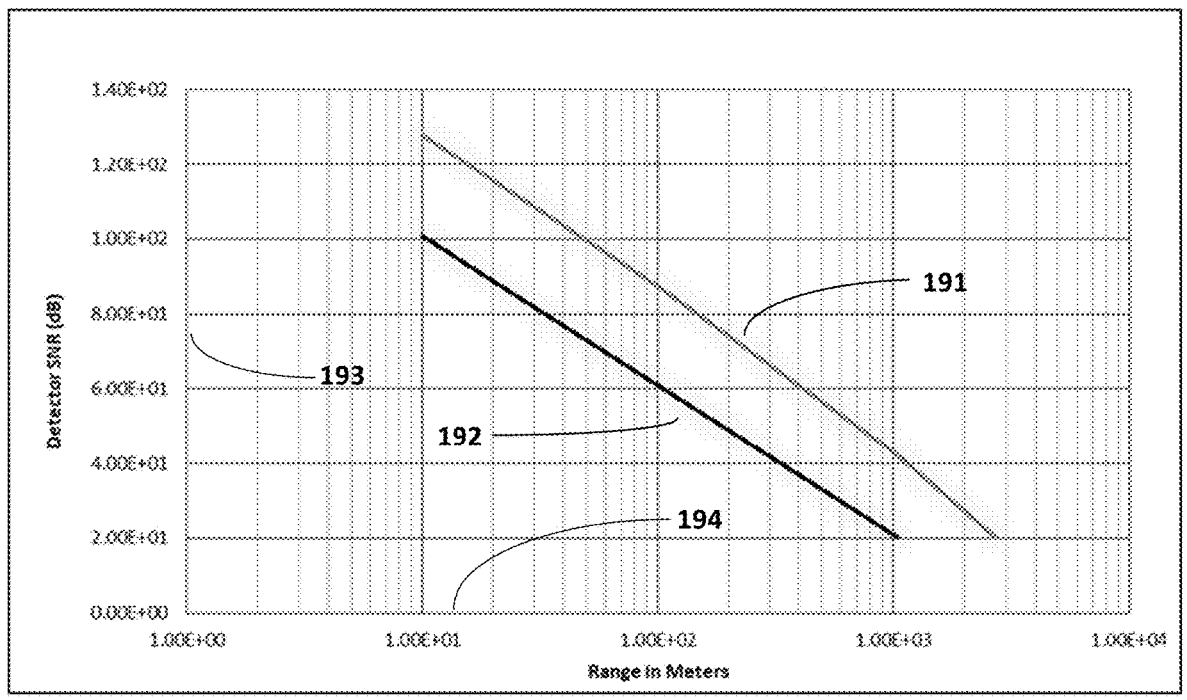
FIG. 9 shows acquisition and communications electrical signal-to-noise versus Range

FIG. 9 shows acquisition 191 and communications 192 curves for electrical signal-to-noise (hereinafter termed Detector SNR 193) versus Range 194 for the system parameter assumptions listed. Note that $7.85*10^{-4}$ Watts emitted power is the eye safe limit for the given emitter beam diameter and wavelength. FIG. 9 shows Detector electronic SNR 193 for propagation in clear air with no attenuation and no beam dispersion. Twenty dB acquisition Detector SNR 193 is attainable at a Range 194 of 2700 M in clear air. Interlocks prevent TALOC emitted power from exceeding eye safe levels during ground operations. When carried aboard an airborne platform, emitted power may be increased to extend acquisition and communications range.

Many additional features and benefits of the invention will be obvious to those versed in the art.

Thus, embodiments can comprise:

1, A bidirectional communication system wherein electromagnetic radiation having wavelengths in the range from 0.1 to 20 micrometers, said radiation hereinafter termed light, propagates through atmospheric medium ranging in optical transmission from that of outer space to that of atmosphere made obscure by the presence of water in various forms, particulate matter, and at least partially transparent solids, said system incorporating a retro-reflector array to facilitate acquisition and tracking, and being associated with at least a first and a second platform, and utilizing a plurality of optical wavelengths to establish tracking, acquisition, and communications.

2. A bidirectional communication system wherein a solid state means for acquisition and tracking functions is incorporated.

3. A bidirectional communication system wherein electromagnetic radiation having wavelength in the range from 0.1 to 20 micrometers, said radiation hereinafter termed light, propagates through atmospheric medium ranging in optical transmission from that of outer space to that of atmosphere made obscure by the presence of water in various forms, particulate matter, and at least partially transparent solids, said system being associated with at least a first and a second platform, wherein;

the light may be modulated, possibly at rates supporting binary information in the range of zero to ten raised to the power of fourteen bits per second, to convey information, from time to time, light emitted by the communication system portion associated with the first platform may propagate from the first platform to the second platform, from time to time, light emitted by the communication system portion associated with the second platform may propagate from the second platform to the first platform, the first and second platforms are each co-located with retroreflectors, An acquisition system portion associated with the first platform emits a first light beam having controlled shape and direction, said direction being variable and capable of propagating toward the second platform retroreflector, a portion of said first light beam impinges on the second platform retroreflector and returns toward the first platform, system elements associated with first and second platforms include electronic processors capable of converting electronic signals to system level information, a detector array on first platform determines the direction, relative to a coordinate system fixed to first platform, of second platform retroreflector using
  information derived from knowledge of the portion of said first platform controlled first light beam shape associated with detector array element illuminated by retroreflector return light, and
  information derived from knowledge of the first light beam direction when retroreflector return light is detected, the communication system portion associated with the first platform emits a modulated second light beam having controlled direction and using information derived from first light beam return detection to accurately propagate said second light beam toward second platform, optical element of communication system portion associated with second platform directs intercepted portion of second light beam to one or more elements of a focal plane detector array that converts detected modulated second beam light to an information bearing electronic signal, the centermost elements within said detector array associated with said first platform are caused to fall in the illumination of said first beam return by means of optical beam scanning elements associated with first platform, the communication system portion associated with the second platform emits a third light beam having controlled shape and direction, said direction being variable and capable of propagating toward the first platform retroreflector, a portion of said third light beam impinges on the first platform retroreflector and returns toward the second platform, a detector array on second platform determines the direction, relative to a coordinate system fixed to second platform, of first platform retroreflector using
  information derived from knowledge of the portion of said second platform controlled third light beam shape associated with detectorarray element illuminated by retroreflector return light, and
  information derived from knowledge of said third light beam direction when retroreflector return light is detected, the communication system portion associated with the second platform emits a modulated fourth light beam having controlled direction and using information derived from third light beam return detection to propagate said fourth beam toward first platform, optical element of communication system portion associated with first platform directs intercepted portion of second light beam to one or more elements of a focal plane detector array associated with first platform that converts detected modulated second beam light to an information bearing electronic signal, the centermost elements within said detector array associated with second platform are caused to fall in the illumination of said third beam return by means of optical beam scanning elements associated with second platform, and one or more emitted fourth light beams are directed from communication system associated with second platform to accurately impinge on first platform using knowledge of first platform direction and using scanning elements to control propagation direction of said fourth light beams associated with second platform.

4. A bidirectional communication system according to claim 3, further comprising at least one of the following elements:

said electronic processor associated with first platform capable of converting electronic signals to system level information that derives
  information equivalent to polar coordinates azimuth angle that identifies said second platform direction relative to first platform using a measurement of time when retroreilected beam returning from second platform is detected and associating measured time with a known relationship between azimuth scan angle and time
  information equivalent to polar coordinates elevation angle that further identifies said second platform direction relative to first platform using identification of the particular element within first platform associated detector array that is illuminated by retroreflector light returning from second platform,
  relative distance between first and second platforms using a measurement of elapsed time between transmission of a light pulse from first platform and detection of retroreflected return beam from second platform and using the known relationship between elapsed time and distance traversed by a pulse traveling at the speed of light, a Super luminescent Light Emitting Diode (hereinafter termed SLED) used to emit and modulate light, a laser used to emit light, means of limiting emitted light to levels that are eye-safe, optical filters that transmit a narrow band around emitted light and prevent unwanted background light from interfering with the performance of detectors, electronic circuits within said electronic processors associated with first and second platforms that enhance the isolation of useful information in the presence of spurious signals using at least one of the following techniques;
  time domain demultiplexing,
  bit pattern decoding,
  bit rate demultiplexing
  carrier frequency demultiplexing,
  wavelet decoding, detector array subsystems according to known designs for video cameras that are used as said detector arrays associated with first and second platforms, video camera that provides information complementary to the information generated from said light, retroreflectors not associated with first or second platforms that provide reflected light detectable by said first platform associated detector array and interpreted by said electronic processor associated with first platform to infer position and orientation of a runway relative to approaching aircraft comprising first platform, emitter on a first platform may be comprised of a plurality of emitter elements that direct light beams toward a plurality of separate remote platforms.

5. A bidirectional communication system wherein electromagnetic radiation having wavelength in the range from 0.1 to 20 micrometers, said radiation hereinafter termed light, propagates through atmospheric medium ranging in optical transmission from that of outer space to that of atmosphere made obscure by the presence of water in various forms, particulate matter, and at least partially transparent solids, said system being associated with at least a first and a second platform, wherein;

the light may be modulated, possibly at rates supporting binary information in the range of zero to ten raised to the power of fourteen bits per second, to convey information, from time to time, light emitted by the communication system portion associated with the first platform may propagate from the first platform to the second platform, from time to time, light emitted by the communication system portion associated with the second platform may propagate from the second platform to the first platform, the first and second platforms are each co-located with retroreflectors, the communication system portion associated with the first platform emits a first light beam having controlled shape and direction, said direction being variable and capable of propagating toward the second platform retroreflector, a portion of said first light beam impinges on the second platform retroreflector and returns toward the first platform, system elements associated with first and second platforms include electronic processors capable of converting electronic signals to system level information, a detector array on first platform determines the direction, relative to a coordinate system fixed to first platform, of second platform retroreflector using information derived from knowledge of the portion of said first platform controlled first light beam shape associated with detector array element illuminated by retroreflector return light, and information derived from knowledge of the first light beam direction when retroreOector return light is detected, the communication system portion associated with the first platform emits a modulated second light beam having controlled direction and using information derived from first light beam return detection to accurately propagate said second light beam toward second platform, optical element of communication system portion associated with second platform directs intercepted portion of second light beam to one or more elements of a focal plane detector array that converts detected modulated second beam light to an information bearing electronic signal, the centermost elements within said detector array associated with said first platform are caused to fall in the illumination of said first beam return by means of optical beam scanning elements associated with first platform, the communication system portion associated with the second platform emits a third light beam having controlled shape and direction, said direction being variable and capable of propagating toward the first platform retroreflector, a portion of said third light beam impinges on the first platform retroreflector and returns toward the second platform, a detector array on second platform determines the direction, relative to a coordinate system fixed to second platform, of first platform retroreflector using information derived from knowledge of the portion of said second platform controlled third light beam shape associated with detector array element illuminated by retroreflector return light, and information derived from knowledge of said third light beam direction when retroreflector return light is detected, the communication system portion associated with the second platform emits a modulated fourth light beam having controlled direction and using information derived from third light beam return detection to propagate said fourth beam toward first platform, optical element of communication system portion associated with first platform directs intercepted portion of second light beam to one or more elements of a focal plane detector array associated with first platform that converts detected modulated second beam light to an information bearing electronic signal, the centermost elements within said detector array associated with second platform are caused to fall in the illumination of said third beam return by means of optical beam scanning elements associated with second platform, one or more emitted fourth light beams are directed from communication system associated with second platform to accurately impinge on first platform using knowledge of first platform direction and using scanning elements to control propagation direction of said fourth light beams associated with second platform, and said electronic processors capable of converting electronic signals to system level information are also capable of converting information from several sensors co-located with first or second platform and sharing information between platforms to develop within said electronic processor memories a virtual reality model of the environment surrounding first and second platforms.

6. A multi-directional communication system wherein electromagnetic radiation having wavelength in the range from 0.1 to 20 micrometers, said radiation hereinafter termed light, propagates through atmospheric medium ranging in optical transmission from that of outer space to that of atmosphere made obscure by the presence of water in various forms, palticulate matter, and at least partially transparent solids, said system being associated with a plurality of platforms, each of which may serve as the location for a plurality of subsystems communicating with other platforms in pairs within which one pair element is identified as first platform and the other pair element is identified as second platform wherein;

the light may be modulated, possibly at rates supporting binary information in the range of zero to ten raised to the power of fourteen bits per second, to convey information, from time to time, light emitted by the communication system portion associated with the first platform may propagate from the first platform to the second platform, from time to time, light emitted by the communication system portion associated with the second platform may propagate from the second platform to the first platform, the first and second platforms are each co-located with retroreflectors, the communication system portion associated with the first platform emits a first light beam having controlled shape and direction, said direction being variable and capable of propagating toward the second platform retroreflector, a portion of said first light beam impinges on the second platform retroreflector and returns toward the first platform, system elements associated with first and second platforms include electronic processors capable of converting electronic signals to system level information, a detector array on first platform determines the direction, relative to a coordinate system fixed to first platform, of second platform retroreflector using information derived from knowledge of the portion of said first platform controlled first light beam shape associated with detector array element illuminated by retroreflector return light, and information derived from knowledge of the first light beam direction when retroreflector return light is detected, the communication system portion associated with the first platform emits a modulated second light beam having controlled direction and using information derived from first light beam return detection to accurately propagate said second light beam toward second platform, optical element of communication system portion associated with second platform directs intercepted portion of second light beam to one or more elements of a focal plane detector array that converts detected modulated second beam light to an information hearing electronic signal, the centermost elements within said detector array associated with said first platform are caused to fall in the illumination of said first beam return by means of optical beam scanning elements associated with first platform, the communication system portion associated with the second platform emits a third light beam having controlled shape and direction, said direction being variable and capable of propagating toward the first platform retroreflector, a portion of said third light beam impinges on the first platform retroreflector and returns toward the second platform, a detector array on second platform determines the direction, relative to a coordinate system fixed to second platform, of first platform retroreflector using information derived from knowledge of the portion of said second platform controlled third light beam shape associated with detector array element illuminated with retroreflector return light, and information derived from knowledge of said third light beam direction when retroreflector return light is detected, the communication system portion associated with the second platform emits a modulated fourth light beam having controlled direction and using information derived. from third light beam return detection to propagate said fourth beam toward first platform, optical element of communication system portion associated with first platform directs intercepted portion of second light beam to one or more elements of a focal plane detector array associated with first platform that converts detected modulated second bears light to an information bearing electronic signal, the centermost elements within said detector array associated with second platform are caused to fall in the illumination of said third beam return by means of optical beam scanning elements associated with second platform, one or more emitted fourth light beams are directed from communication system associated with second platform to accurately impinge on first platform using knowledge of first platform direction and using scanning elements to control propagation direction of said fourth light beams associated with second platform, and said electronic processors capable of converting electronic signals to system level information are also capable of interconnecting across a plurality of platform pairs to constitute a distributed mobile network and thereby form a mobile platform community having processing capabilities beyond the scope of any single one of said electronic processors capable of converting electronic signals to system level information.

7. A mobile platform community in accordance with claim 6, further characterized in that said multi-directional communication system operates as a subsystem within a larger system selected from the group consisting of:

a plurality of satellites maintaining a desired relative and absolute alignment, a plurality of ground vehicles operating safely and autonomously, a plurality of air vehicles operating safely and autonomously, a virtual reality model of said mobile platform community incorporating accurate positions, orientations, and velocity vectors of all platforms comprising the community, determined relative to a coordinate reference associated with one of the community platforms, a virtual reality model of said mobile platform community incorporating accurate positions, orientations, and velocity vectors of all platforms comprising the community, further incorporating location of a remote station, a phase array antenna that uses known locations of all platforms comprising said mobile platform community to generate in-phase bidirectional radio frequency signal transmission between said mobile platform community and said remote station, a plurality of unpiloted airborne vehicles, a plurality of piloted airborne vehicles, a spacecraft engaged in docking maneuvers, a spacecraft convoy group, a plurality of communicating spacecraft,
an aircraft landing on an airborne carrier,
an aircraft landing on an ocean carrier,
an aircraft landing on a ground based runway,
ground vehicles capable of at least one of
 situation awareness leading to collision avoidance,
 convoy,
 automated driving,
unpiloted airborne vehicles conducting coordinated missions,
guidance of a moving vehicle external to said mobile platform community to a predetermined end point,
processor integrating knowledge of mobile platform community locations with camera data to create a composite image of selected scenes, and
systems that cooperate with human and/or robotic responders to evacuate casualties and convey them safely to emergency care facilities.

8. The bidirectional communication system of claim 3, further comprising at least one of the following elements:
processor maintaining optimum emitter power to prevent detector saturation as range between platforms shortens,
image enhancement using knowledge of platform mounted camera location,
mutter and detector arrays that address an entire field of regard, thereby reducing the need for scanning,
scanning based on beam deflection using electro-optic effect,
scanning based on a single moving part that positions an emitted beam along two axes,
scanning that reduces the number of required array elements by moving micro-lens array relative to array,
separation of light beams used in communication function from those used in acquisition function using wavelength division multiplexing,
waveguide array sandwiches in which alternating layers are devoted to transmitting and receiving light,
electro-optics that switch light between alternating interleaved waveguide array layers devoted to transmitting and receiving light, and holographic optical element performing at least one of the following functions;
 concentrating or dispersing light in place of or as an adjunct to bulk lens,
 wavelength division multiplexing,
 modification of field of regard.

9. The bidirectional communication system of claim 1 wherein inherent built in test functions are incorporated such as:
Confirmation and improvement of tracking data extracted from the location of the light spot on the detector array,
Confirmation that direction of the second communicating unit indicated by the communication detector array agrees with the tracking array data,
Verification that the SNR agrees with the link budget data.

10. The bidirectional communication system of claim 3, wherein one of the communicating units does not incorporate a retro-reflector.

The invention claimed is:

1. A bi-directional free space optical communications device comprising:
an acquisition and tracking laser operating at a first emitter wavelength;
a communications laser operating at a second emitter wavelength;
a wavelength restricted retro-reflector comprising a single wavelength pass filter disposed at front of said retro-reflector which allows transmission of only the first emitter wavelength;
a first two-axis scanning device configured to scan a horizon in a specified pattern using the first emitter wavelength for acquisition and tracking;
a first detector array including an optical filter configured to cause said first detector array to be sensitive to only the first emitter wavelength;
a second detector array including an optical filter configured to cause said second detector array to be sensitive to only the second emitter wavelength;
a first optical aperture which collects light from the acquisition and tracking laser;
a second optical aperture which collects light from the communications laser; and
a processor configured to control said acquisition and tracking laser, said communications laser, and said first scanning device to acquire and maintain tracking at said first emitter wavelength and communications at said second emitter wavelength.

2. The bi-directional free space optical communications device of claim 1, wherein said first and second optical apertures are comprised of Holographic Optical Elements (HOE).

3. The bi-directional free space optical communications device of claim 1, wherein said first and second detector arrays each comprise a single element detector.

4. The bi-directional free space optical communications device of claim 1, wherein said first scanning device is a solid state electronic device comprising an electro-optic scanner.

5. The bi-directional free space optical communications device of claim 1, further comprising a second two-axis scanning device configured to follow the first scanning device to provide directional tracking for the second detector array.

6. The bi-directional free space optical communications device of claim 5, wherein said first and second scanning devices are solid state devices each comprising an electro-optic scanner.

7. The bi-directional free space optical communications device of claim 5, wherein said first and second scanning devices are each disposed within an interior of an enclosure of said bi-directional free space optical communications device.

8. An optical communication device comprising:
a processor configured to provide at least a tracking mode and a communications mode;
an input/output interface coupled to the processor;
an electro-optic controller coupled to the input/output interface;
an acquisition/tracking portion coupled to the electro-optic controller and comprising
 a tracking laser array coupled to the electro-optic controller via a tracking laser driver; and
 a tracking detector array coupled to the electro-optic controller via a tracking detector signal processor; and
a communication portion coupled to the electro-optic controller and comprising
 a communications laser coupled to the electro-optic controller via a communications laser driver; and
 a communications detector coupled to the electro-optic controller via a communications detector signal processor, wherein said acquisition/tracking portion operates using a first wavelength and said communications portion operates using a second wavelength different from said first wavelength.

9. The optical communication device of claim 8, further comprising:
an elevation scanning assembly having
a focal plane array configured to detect, at different positions along said focal plane array, light which originates from corresponding different azimuth angles;
a detector lens defining a scan axis at a center thereof;
a window through which said scan axis passes in alignment with said detector lens;
a retro-reflector configured to use an optical wavelength to establish tracking, acquisition, and communications;
an emitter lens;
azimuth scanning means; and
a waveguide optical line source,
wherein said elevation scanning assembly is configured, using said azimuth scanning means, to provide two axes of direction control for transmission and detection of optical signals.

10. The optical communication device of claim 8, wherein said tracking laser array, said tracking detector array, said communications laser, and said communications detector are each configured to transmit or receive optical signals comprising electromagnetic radiation having a plurality of wavelengths in high atmospheric transmission bands between 0.1 and 20 micrometers capable of propagating through a free space medium in optical communication in the presence of water, particulate matter, at least partially transparent solids, or a combination thereof, in the medium.

11. The optical communication device of claim 8, wherein said focal plane array comprises a center zone formed by a rectangular array of N pixels in elevation by M pixels in azimuth,
wherein M and N each comprise from 2 to 100 pixels, and
wherein said rectangular array comprises a plurality of pixels which are configured electronically to receive broadband communications signals.

12. The optical communication device of claim 8, wherein one or more of said tracking laser array, said tracking detector array, said communications laser, and said communications detector incorporates a Holographic Optical Element (HOE).

13. An optical communication system comprising:
a plurality of platforms comprising a first platform and a second platform,
wherein each said platform comprises at least one optical communication device comprising
a processor configured to provide at least a tracking mode and a communications mode;
an input/output interface coupled to the processor;
an electro-optic controller coupled to the input/output interface;
an acquisition/tracking portion coupled to the electro-optic controller and comprising
a tracking laser array coupled to the electro-optic controller via a tracking laser driver; and
a tracking detector array coupled to the electro-optic controller via a tracking detector signal processor; and a communication portion coupled to the electro-optic controller and comprising
a communications laser coupled to the electro-optic controller via a communications laser driver; and
a communications detector coupled to the electro-optic controller via a communications detector signal processor,
wherein said acquisition/tracking portion operates using a first wavelength and said communications portion operates using a second wavelength different from said first wavelength.

14. The optical communication system of claim 13,
wherein said at least one optical communication device further comprises a plurality of said optical communication devices,
wherein one said optical communication device is disposed at each of a top of each said platform, a bottom of each said platform, a front of each said platform, and a back of each said platform, and
wherein the top and bottom optical communication devices are cooperatively disposed so as to cover 360 degrees in elevation about a central platform axis, and said front and back optical communication devices are cooperatively disposed so as to provide angular coverage sufficient to enable at least one said optical communication device to establish an optical line-of-sight connection in any direction surrounding any one of the first platform and second platforms with the other of the first and second platforms.

15. The optical communication system of claim 14,
wherein each said optical communication device further comprises an elevation scanning assembly having mounted thereon
a focal plane array configured to detect, at different positions along said focal plane array, light which originates from corresponding different azimuth angles;
a detector lens defining a scan axis at a center thereof;
a window through which said scan axis passes in alignment with said detector lens;
a retro-reflector configured to use an optical wavelength to establish tracking, acquisition, and communications;
an emitter lens;
azimuth scanning means; and
a waveguide optical line source,
wherein said elevation scanning assembly is configured, using said azimuth scanning means, to provide two axes of direction control for transmission and detection of optical signals.

16. The optical communication system of claim 15,
wherein said optical communication device is configured to transmit or receive optical signals comprising electromagnetic radiation having a plurality of wavelengths in high atmospheric transmission bands between 0.1 and 20 micrometers capable of propagating through a free space medium in optical communication in the presence of atmospheric obscurations comprising one or more of water, particulate matter, and at least partially transparent solids.

17. The optical communication system of claim 15,
wherein at least one of said plurality of platforms is disposed at a first altitude and at least one other of said plurality of platforms is disposed at a second altitude.

18. The optical communication system of claim 15,
wherein the retro-reflector of the optical communication device of the second platform reflects optical signals back to the optical communication device of the first platform, and
wherein, upon detection of the reflected optical signals by the tracking detector array of the optical communication device of the first platform, the acquisition/tracking portion of the optical communication device of the first platform is configured to determine a retro-reflector angle pair associated with the second platform and to track a position of the second platform.

* * * * *